United States Patent
Hapsari et al.

(10) Patent No.: US 9,532,384 B2
(45) Date of Patent: Dec. 27, 2016

(54) MOBILE COMMUNICATION METHOD AND RADIO BASE STATION

(71) Applicant: NTT DOCOMO, INC., Tokyo (JP)

(72) Inventors: Wuri Andarmawanti Hapsari, Tokyo (JP); Tooru Uchino, Tokyo (JP); Kohei Kiyoshima, Tokyo (JP); Hideaki Takahashi, Tokyo (JP); Kenichiro Aoyagi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 4 days.

(21) Appl. No.: 14/412,899

(22) PCT Filed: Jul. 2, 2013

(86) PCT No.: PCT/JP2013/068158
§ 371 (c)(1),
(2) Date: Jan. 5, 2015

(87) PCT Pub. No.: WO2014/007257
PCT Pub. Date: Jan. 9, 2014

(65) Prior Publication Data
US 2015/0156799 A1   Jun. 4, 2015

(30) Foreign Application Priority Data
Jul. 6, 2012   (JP) .................. 2012-152309

(51) Int. Cl.
*H04W 74/08*   (2009.01)
*H04W 52/02*   (2009.01)
(Continued)

(52) U.S. Cl.
CPC ........... *H04W 74/0833* (2013.01); *H04W 4/22* (2013.01); *H04W 52/0216* (2013.01);
(Continued)

(58) Field of Classification Search
CPC ............... H04W 4/22; H04W 52/0216; H04W 52/0251; H04W 72/02; H04W 72/04; H04W 72/14; H04W 74/08; H04W 74/0833; H04W 76/04; H04W 76/007; H04W 76/048; H04W 76/046
See application file for complete search history.

(56) References Cited

U.S. PATENT DOCUMENTS

2003/0224719 A1* 12/2003 Lucidarme ............ H04W 48/02
455/1
2009/0129339 A1*  5/2009 Young .................. H04W 72/02
370/331
(Continued)

FOREIGN PATENT DOCUMENTS

| EP | 2352352 A1 | 8/2011 |
|---|---|---|
| JP | 2011-504021 A | 1/2011 |
| WO | 2009/062303 A1 | 5/2009 |

OTHER PUBLICATIONS

International Search Report for corresponding International Application No. PCT/JP2013/068158, mailed Oct. 1, 2013 (1 page).
(Continued)

*Primary Examiner* — Benjamin H Elliott, IV
*Assistant Examiner* — Prince A Mensah
(74) *Attorney, Agent, or Firm* — Osha Liang LLP

(57) ABSTRACT

A mobile communication method according to the present invention includes executing an RA procedure between a mobile station (UE) and a radio base station (eNB) when the mobile station (UE) in a DRX state makes a return to a non-DRX state in order to perform call origination processing. The method comprises: a step A of causing the radio base station (eNB) in the RA procedure to transmit "Call Identification Request" to the mobile terminal (UE); a step B of causing the mobile terminal (UE) in the RA procedure to notify the radio base station (eNB) of "Call Identification" in response to the "Call Identification Request"; and a step C of causing the radio base station (eNB) in the RA
(Continued)

procedure to determine whether to allow the abovementioned return on the basis of the "Call Identification".

5 Claims, 8 Drawing Sheets

(51) Int. Cl.
    *H04W 4/22*     (2009.01)
    *H04W 76/00*     (2009.01)
    *H04W 76/04*     (2009.01)

(52) U.S. Cl.
    CPC ......... *H04W 74/08* (2013.01); *H04W 76/007* (2013.01); *H04W 76/04* (2013.01); *H04W 76/048* (2013.01)

(56) References Cited

U.S. PATENT DOCUMENTS

| | | | |
|---|---|---|---|
| 2011/0183648 A1* | 7/2011 | Takagi | H04W 52/0254 455/411 |
| 2011/0222498 A1* | 9/2011 | Chun | H04L 1/1822 370/329 |
| 2012/0063305 A1 | 3/2012 | Chiu et al. | |

OTHER PUBLICATIONS

Written Opinion for corresponding International Application No. PCT/JP2013/068158, mailed Oct. 1, 2013 (3 pages).

3GPP TS 36.300 V11.2.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11);" Jun. 2012 (201 pages).

NTT Docomo, Inc.; "Problem caused by DRX UE in congested network;" 3GPP TSG-RAN2#78, R2-122543; Prague, Czech; May 21-25, 2012 (3 pages).

3GPP TS 36.331 V11.0.0; "3rd Generation Partnership Project; Technical Specification Group Radio Access Network; Evolved Universal Terrestrial Radio Access (E-UTRA); Radio Resource Control (RRC); Protocol specification (Release 11);" Jun. 2012 (302 pages).

3GPP TSs 36.321 V10.5.0; "3rd Generation Partnership Project; Technical Specification Group Radio Access Network; Evolved Universal Terrestrial Radio Access (E-UTRA); Medium Access Control (MAC) protocol specification (Release 10);" Mar. 2012 (54 pages).

3GPP TS 36.213 V10.6.0; "3rd Generation Partnership Project; Technical Specification Group Radio Access Network; Evolved Universal Terrestrial Radio Access (E-UTRA); Physical layer procedures (Release 10);" Jun. 2012 (125 pages).

3GPP TS 36.211 V10.5.0; "3rd Generation Partnership Project; Technical Specification Group Radio Access Network; Evolved Universal Terrestrial Radio Access (E-UTRA); Physical Channels and Modulation (Release 10);" Jun. 2012 (101 pages).

Extended Search Report issued in corresponding European Application No. 13812638.8, mailed Mar. 23, 2016 (4 pages).

\* cited by examiner

FIG. 4

TABLE 6.2.1-1 VALUES OF LCID FOR DL-SCH

| INDEX | LCID VALUES |
|---|---|
| 00000 | CCCH |
| 00001-01010 | IDENTITY OF THE LOGICAL CHANNEL |
| 01011-11001 | RESERVED |
| 11010 | CALL INDICATION REQUEST |
| 11001 | CALL INDICATION |
| 11011 | ACTIVATION/DEACTIVATION |
| 11100 | UE CONTENTION RESOLUTION IDENTITY |
| 11101 | TIMING ADVANCE COMMAND |
| 11110 | DRX COMMAND |
| 11111 | PADDING |

FIG. 6

RACH-ConfigCommon information element

```
-- ASN1START

RACH-ConfigCommon ::=          SEQUENCE {
    preambleInfo                     SEQUENCE {
        numberOfRA-Preambles             ENUMERATED {
                                             n4, n8, n12, n16 ,n20, n24, n28,
                                             n32, n36, n40, n44, n48, n52, n56,
                                             n60, n64},
        preamblesGroupAConfig            SEQUENCE {
            sizeOfRA-PreamblesGroupA         ENUMERATED {
                                                 n4, n8, n12, n16 ,n20, n24, n28,
                                                 n32, n36, n40, n44, n48, n52, n56,
                                                 n60},
            messageSizeGroupA                ENUMERATED {b56, b144, b208, b256},
            messagePowerOffsetGroupB         ENUMERATED {
                                                 minusinfinity, dB0, dB5, dB8, dB10, dB12,
                                                 dB15, dB18},
            ...
        }       OPTIONAL                                                   -- Need OP
    },
    powerRampingParameters           SEQUENCE {
        powerRampingStep                 ENUMERATED {dB0, dB2,dB4, dB6},
        preambleInitialReceivedTargetPower  ENUMERATED {
                                             dBm-120, dBm-118, dBm-116, dBm-114, dBm-112,
                                             dBm-110, dBm-108, dBm-106, dBm-104, dBm-102,
                                             dBm-100, dBm-98, dBm-96, dBm-94,
                                             dBm-92, dBm-90}
    },
    ra-SupervisionInfo               SEQUENCE {
        preambleTransMax                 ENUMERATED {
                                             n3, n4, n5, n6, n7, n8, n10, n20, n50,
                                             n100, n200},
        ra-ResponseWindowSize            ENUMERATED {
                                             sf2, sf3, sf4, sf5, sf6, sf7,
                                             sf8, sf10},
        mac-ContentionResolutionTimer    ENUMERATED {
                                             sf8, sf16, sf24, sf32, sf40, sf48,
                                             sf56, sf64}
    },
    maxHARQ-Msg3Tx                   INTEGER (1..8),
    ...,
    [[  waitTime                     INTEGER (1..16),    OPTIONAL    -- Need ON,
    ]]
}

-- ASN1STOP
```

FIG. 7

| RACH-ConfigCommon field descriptions |
|---|
| *mac-ContentionResolutionTimer*<br>Timer for contention resolution in TS 36.321 [6]. Value in subframes. Value sf8 corresponds to 8 subframes, sf16 corresponds to 16 subframes and so on. |
| *maxHARQ-Msg3Tx*<br>Maximum number of Msg3 HARQ transmissions in TS 36.321 [6], used for contention based random access. Value is an integer. |
| *messagePowerOffsetGroupB*<br>Threshold for preamble selection in TS 36.321 [6]. Value in dB. Value minusinfinity corresponds to –infinity. Value dB0 corresponds to 0 dB, dB5 corresponds to 5 dB and so on. |
| *messageSizeGroupA*<br>Threshold for preamble selection in TS 36.321 [6]. Value in bits. Value b56 corresponds to 56 bits, b144 corresponds to 144 bits and so on. |
| *numberOfRA-Preambles*<br>Number of non-dedicated random access preambles in TS 36.321 [6]. Value is an integer. Value n4 corresponds to 4, n8 corresponds to 8 and so on. |
| *powerRampingStep*<br>Power ramping factor in TS 36.321 [6]. Value in dB. Value dB0 corresponds to 0 dB, dB2 corresponds to 2 dB and so on. |
| *preambleInitialReceivedTargetPower*<br>Initial preamble power in TS 36.321 [6]. Value in dBm. Value dBm-120 corresponds to -120 dBm, dBm-118 corresponds to -118 dBm and so on. |
| *preamblesGroupAConfig*<br>Provides the configuration for preamble grouping in TS 36.321 [6]. If the field is not signalled, the size of the random access preambles group A [6] is equal to *numberOfRA-Preambles*. |
| *preambleTransMax*<br>Maximum number of preamble transmission in TS 36.321 [6]. Value is an integer. Value n3 corresponds to 3, n4 corresponds to 4 and so on. |
| *ra-ResponseWindowSize*<br>Duration of the RA response window in TS 36.321 [6]. Value in subframes. Value sf2 corresponds to 2 subframes, sf3 corresponds to 3 subframes and so on. |
| *sizeOfRA-PreamblesGroupA*<br>Size of the random access preambles group A in TS 36.321 [6]. Value is an integer. Value n4 corresponds to 4, n8 corresponds to 8 and so on. |
| *waitTime*<br>Wait time value in seconds. |

| VALUE (HEXA-DECIMAL) | RNTI |
|---|---|
| 0000 | N/A |
| 0001-003C | RA-RNTI, C-RNTI, SEMI-PERSISTENT SCHEDULING C-RNTI, TEMPORARY C-RNTI, TPC-PUCCH-RNTI AND TPC-PUSCH-RNTI (SEE NOTE) |
| 003D-FFF3 | C-RNTI, SEMI-PERSISTENT SCHEDULING C-RNTI, TEMPORARY C-RNTI, TPC-PUCCH-RNTI AND TPC-PUSCH-RNTI |
| FFF4-FFFB | RESERVED FOR FUTURE USE |
| FFFFC | RA-REJECT-RNTI |
| FFFD | M-RNTI |
| FFFE | P-RNTI |
| FFFF | SI-RNTI |

MOBILE COMMUNICATION METHOD AND RADIO BASE STATION

TECHNICAL FIELD

The present invention relates to a mobile communication method and a radio base station.

BACKGROUND ART

In order to reduce a load of signaling of a core network, a communication system of LTE (Long Term Evolution) enables a mobile station UE in a RRC_CONNECTED state (a connected state) to enter a DRX (Discontinuous Reception) state (an intermittent reception state) without transition to a RRC_IDLE state (an idle state).

In certain situations such as disasters, concert venue, and fireworks venue, a large number of mobile stations UE in the DRX state try to perform call origination processing and thereby cause burst traffic.

The mobile station UE executes a RA (random access) procedure (a RA procedure), specifically, "Contention based RA procedure", with a radio base station eNB, when the mobile station UE in the DRX state returns to a non-DRX state (a continuous reception state) to perform call origination processing.

PRIOR ART DOCUMENT

Non-Patent Document

Non-patent document 1: 3GPP TS36.300
Non-patent document 2: 3GPP TS36.211
Non-patent document 3: 3GPP TS36.213
Non-patent document 4: 3GPP TS36.321
Non-patent document 5: 3GPP TS36.331

SUMMARY OF THE INVENTION

However, an LTE conventional mobile communication system is configured not to check a call type concerned in call origination processing, when a mobile station UE in a DRX state returns to a non-DRX state in order to perform the call origination processing.

This poses a problem in that there is a possibility of a failure in call origination processing of an emergency call from the mobile station UE in the DRX state or call origination processing from a priority terminal in the DRX state.

Thus, the present invention has been made in view of the above-described problem, and aims to provide a mobile communication method and a radio base station that are capable of improving the probability of success, even under traffic congestion, in call origination processing of an emergency call from a mobile station UE in a DRX state or call origination processing from a priority terminal in the DRX state.

A first feature of the invention is summarized as a mobile communication method of executing a random access procedure between a mobile station and a radio base station, when the mobile station in an intermittent reception state makes a return to a continuous reception state to perform call origination processing, the mobile communication method including: a step A of causing the radio base station in the random access procedure to transmit a call-type request signal to the mobile station, the call-type request signal requesting notification of a call type concerned in the call origination processing; a step B of causing the mobile station in the random access procedure to notify the radio base station of the call type in response to the call-type request signal; and a step C of causing the radio base station in the random access procedure to determine whether to allow the return based on the call type.

A second feature of the invention is summarized as a radio base station eNB including: a random-access-procedure execution unit configured to execute a random access procedure with a mobile station, when the mobile station makes a return from an intermittent reception state to a continuous reception state; and a determination unit configured to determine whether to allow the return. Here, the random-access-procedure execution unit is configured to transmit a call-type request signal to the mobile station in the random access procedure, the call-type request signal requesting notification of a call type concerned in the call origination processing, and the determination unit is configured to determine, in the random access procedure, whether to allow the return based on the call type notified by the mobile station in response to the call-type request signal.

BRIEF DESCRIPTION OF THE DRAWINGS

FIG. 4 is a diagram showing an example of MAC-CE transmitted by the radio base station according to the first embodiment of the present invention.

FIG. 6 is a diagram showing an example of "RACH-ConfigCommon" transmitted by the radio base station according to the first embodiment of the present invention.

FIG. 7 is a diagram showing an example of "RACH-ConfigCommon" transmitted by the radio base station according to the first embodiment of the present invention.

MODE FOR CARRYING OUT THE INVENTION (Mobile Communication System According to First Embodiment of Present Invention)

A mobile communication system according to a first embodiment of the present invention is described with reference to FIG. 1 to FIG. 9.

Figure 1:
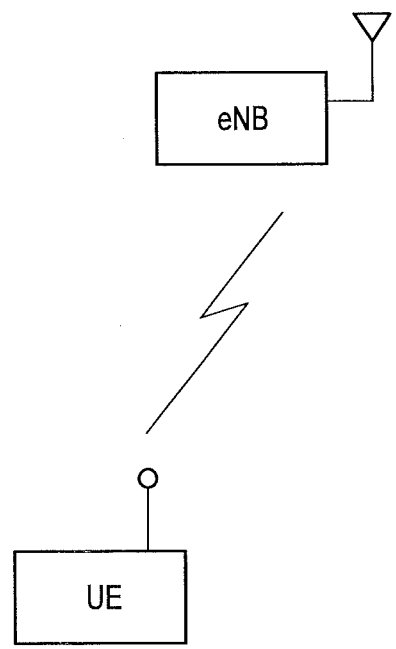
FIG. 1 is an overall configuration diagram of a mobile communication system according to a first embodiment of the present invention.

The mobile communication system according to the present embodiment supports LTE, and includes a radio base station eNB and a mobile station UE, as shown in FIG. 1.

Figure 2:
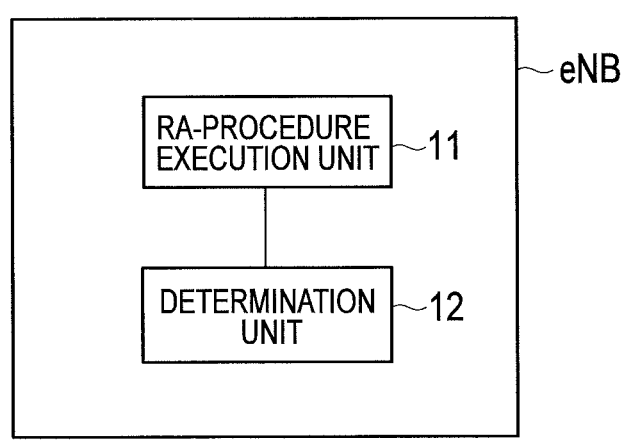
FIG. 2 is a functional block diagram of a radio base station according to the first embodiment of the present invention.

The radio base station eNB according to the present embodiment includes a RA-procedure execution unit 11 and a determination unit 12, as shown in FIG. 2.

The RA-procedure execution unit 11 is configured to perform an RA procedure with the mobile station UE.

For example, the RA-procedure execution unit 11 is configured to execute the RA procedure with the mobile station UE, when the mobile station UE makes a return from a DRX state to a non-DRX state or makes a transition from a RRC_IDLE state to a RRC_CONNECTED state in order to perform call origination processing.

Here, the RA procedure in the return of the mobile station UE from the DRX state to the non-DRX state is different from the RA procedure in the transition of the mobile station UE from the RRC_IDLE state to the RRC_CONNECTED state.

Further, the RA-procedure execution unit 11 is configured to transmit "Call Identification Request" to the mobile station UE in the above-described RA procedure. The "Call Identification Request" requests notification of "Call Identification" concerned in the above-described call origination processing.

Here, the RA-procedure execution unit 11 may be configured to transmit "Call Identification Request", together with "Random Access Response".

For example, the RA-procedure execution unit 11 may be configured to transmit "Call Identification Request" in "Random Access Response".

Alternatively, the RA-procedure execution unit 11 may be configured to transmit "Call Identification Request" by new MAC-PDU to be transmitted with "Random Access Response".

Figure 3:
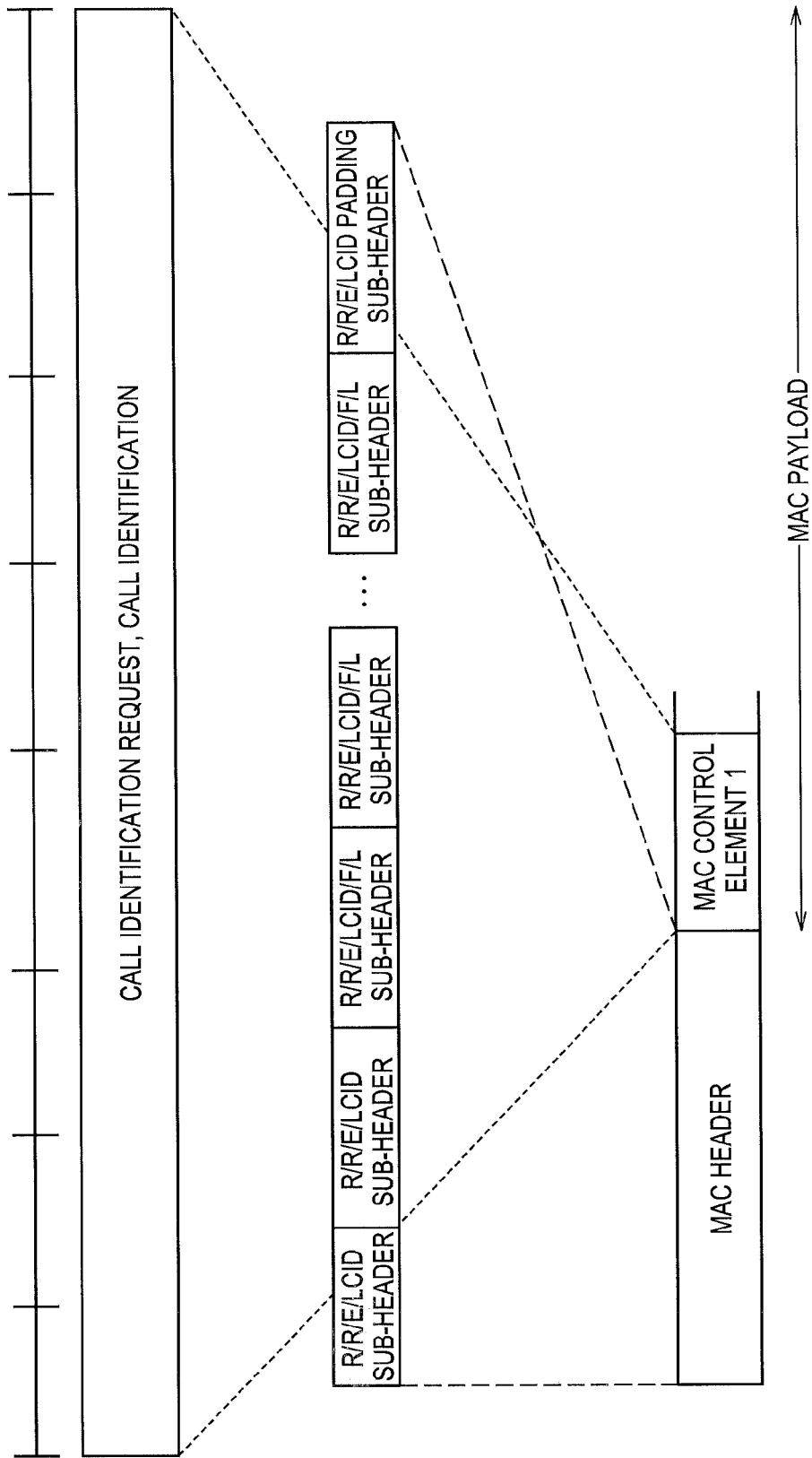
FIG. 3 is a diagram showing an example of MAC-CE transmitted by the radio base station according to the first embodiment of the present invention.

For example, the RA-procedure execution unit 11 may be configured to transmit "Call Identification Request", by using new MAC-CE (Media Access Control-Control Element) shown in FIG. 3, as the new MAC-PDU to be transmitted with "Random Access Response".

Note that, LCID (Logical Channel ID) given to this new MAC-CE may be configured to be "11010" as shown in FIG. 4, for example.

The determination unit 12 is configured to determine whether to accept the return, in the RA procedure in the return of the mobile station UE from the DRX state to the non-DRX state.

Specifically, the determination unit 12 may be configured to determine whether to allow the above-described return, based on "Call Identification" notified by the mobile station UE in response to "Call Identification Request", in the above-described RA procedure.

For example, the determination unit 12 may be configured to determine to allow the above-described return, when determining that a call type concerned in the above-described RA procedure" is "emergency call" or "priority call" based on "Call Identification", i.e., when determining that call origination processing triggering the above-described RA procedure is call origination processing of an emergency call from the mobile station UE or call origination processing from a priority terminal.

On the other hand, the determination unit 12 may be configured to determine to reject the above-described return, when determining that the call type concerned in the above-described RA procedure" is "ordinary call" based on "Call Identification", i.e., when determining that the call origination processing triggering the above-described RA procedure is other than call origination processing of an emergency call from the mobile station UE or call origination processing from the priority terminal.

Further, for example, the determination unit 12 may be configured to be capable of making the determination, based on a congestion state of a wireless access network, a predetermined operator rule, or the like.

Furthermore, the RA-procedure execution unit 11 may be configured to transmit predetermined MAC-CE in response to MAC-CE received from the mobile station UE in the above-described RA procedure, when the return is rejected, i.e., when the determination unit 12 rejects the return.

Note that, in this case, the RA-procedure execution unit 11 may be configured to transmit the predetermined MAC-CE instead of transmitting PDCCH using C-RNTI notified by MAC-CE received from the mobile station UE, or may be configured to transmit the predetermined MAC-CE in addition to the PDCCH using the C-RNTI.

Here, the predetermined MAC-CE may be new MAC-CE, or may be already-existing "DRX Command MAC Control Element".

Further, the RA-procedure execution unit 11 may be configured to notify a wait time lasting until the mobile station UE can retry the RA procedure, by predetermined MAC-CE.

Figure 5:
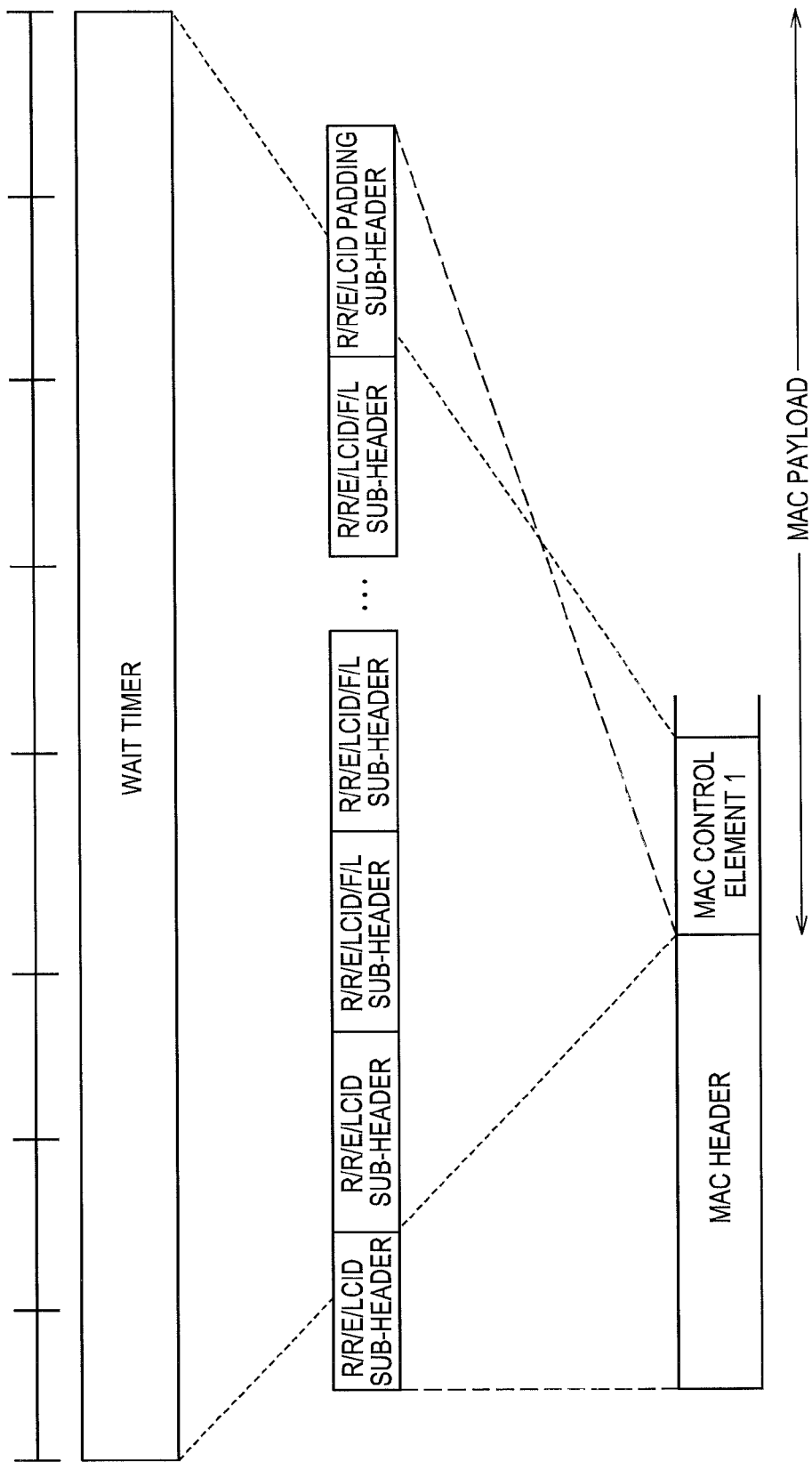
FIG. 5 is a diagram showing an example of MAC-CE transmitted by the radio base station according to the first embodiment of the present invention.

In this case, for example, new MAC-CE may be configured to be capable of notifying "Wait timer" indicating the wait time lasting until the mobile station UE can retry the RA procedure, as shown in FIG. 5. For example, a unit to be set in "Wait timer" may be "second", "minute", or the like.

Alternatively, the RA-procedure execution unit 11 may be configured to notify a wait time lasting until the mobile station UE can retry the RA procedure, by an RRC message (individual signaling), e.g., "RACH-ConfigCommon" transmitted when RRC connection is established.

In this case, for example, "RACH-ConfigCommon" may be configured to be capable of notifying "waitTime" indicating the wait time lasting until the mobile station UE can retry the RA procedure as shown in FIG. 6 and FIG. 7. For example, a unit to be set in "waitTime" may be "second", "minute", or the like.

Alternatively, the RA-procedure execution unit 11 may be configured to notify a wait time lasting until the mobile station UE can retry the RA procedure, by an RRC message (individual signaling), in RRC connection reconfiguration (RRC Connection Reconfiguration).

Alternatively, the RA-procedure execution unit 11 may be configured to notify a wait time lasting until the mobile station UE can retry the RA procedure, by "RACH Config IE" of SIB (System Information Block).

Further, the RA-procedure execution unit 11 may be configured to transmit "RRC Connection Release" in response to MAC-CE received from the mobile station UE, in the above-described RA procedure, in the rejection of the above-described return.

Here, the RA-procedure execution unit 11 may be configured to cause a transition of the mobile station UE to the RRC_IDLE state, by "RRC Connection Release". Note that, the network may utilize ACB for the RRC_IDLE state, i.e., the network may inform ACB information, in the RRC_IDLE state.

Figure 8:
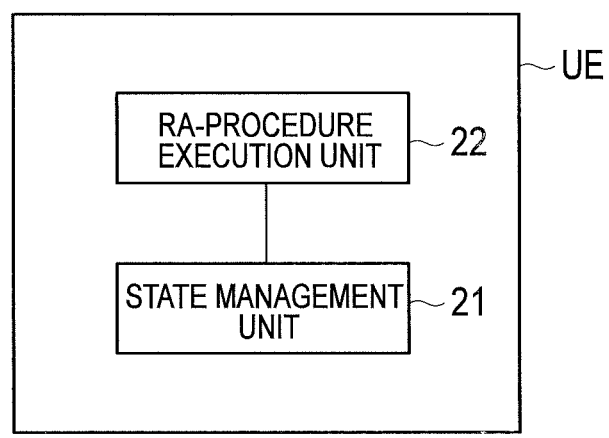
FIG. 8 is a functional block diagram of a mobile station according to the first embodiment of the present invention.

The mobile station UE includes a state management unit 21 and a RA-procedure execution unit 22 as shown in FIG. 8.

The state management unit 21 is configured to manage the state of the mobile station UE, e.g., the DRX state, the non-DRX state (the RRC_CONNECTED state), and the RRC_IDLE state.

The RA-procedure execution unit 22 is configured to perform an RA procedure with the radio base station eNB.

For example, the RA-procedure execution unit 22 is configured to perform the RA procedure with the radio base station eNB, when the mobile station UE is returned from the DRX state to the non-DRX state, or is transitioned from the RRC_IDLE state to the RRC_CONNECTED state, to perform call origination processing.

Here, the RA-procedure execution unit 22 is configured to notify the radio base station eNB of "Call Identification" in response to "Call Identification Request" received from the radio base station eNB, in the RA procedure.

In this case, the RA-procedure execution unit 22 may be configured to notify the radio base station eNB of "Call Identification" together with "Message3".

For example, the RA-procedure execution unit 22 may be configured to notify "Call Identification" in "Message3".

Alternatively, the RA-procedure execution unit 22 may be configured to notify "Call Identification" by new MAC-PDU to be transmitted with "Message3".

For example, the RA-procedure execution unit 22 may be configured to transmit "Call Identification", by using new MAC-CE shown in FIG. 3, as the new MAC-PDU to be transmitted with "Message3".

Note that, LCID given to this new MAC-CE may be configured to be "11001" as shown in FIG. 4, for example.

The state management unit 21 is configured to determine staying in the DRX state without returning from the DRX state to the non-DRX state, when the RA-procedure execution unit 22 receives predetermined MAC-CE from the radio base station eNB, in place of PDCCH using C-RNTI notified by MAC-CE transmitted to the radio base station eNB, in the RA procedure in the return from the DRX state to the non-DRX state.

Further, the RA-procedure execution unit 22 may be configured not to try the above-described RA procedure, during a period before expiration of "Wait timer", when this "Wait timer" is notified by predetermined MAC-CE, in the above-described RA procedure.

Alternatively, the RA-procedure execution unit 22 may be configured not to try the above-described RA procedure, during a period before expiration of "waitTime", when receiving predetermined MAC-CE as well as being notified of this "waitTtime" by "RACH-ConfigCommon", in the above-described RA procedure.

Alternatively, the RA-procedure execution unit 22 may be configured not to try the above-described RA procedure, for a fixed period of time, e.g., a period (9600 ms) ten times a maximum value (960 ms) of existing "Backoff timer", when receiving predetermined MAC-CE, in the above-described RA procedure.

Furthermore, the state management unit 21 may be configured to transition to the RRC_IDLE state, when the RA-procedure execution unit 22 receives "RRC Connection Release" from the radio base station eNB, in the above-described RA procedure.

Here, the RA-procedure execution unit 22 may be configured not to try the above-described RA procedure, during a period before expiration of "waitTime", when being notified of this "waitTime" by "RRC Connection Release".

Operation of the mobile communication system according to the present embodiment is described below with reference to FIG. 9.

Figures 9, 10:
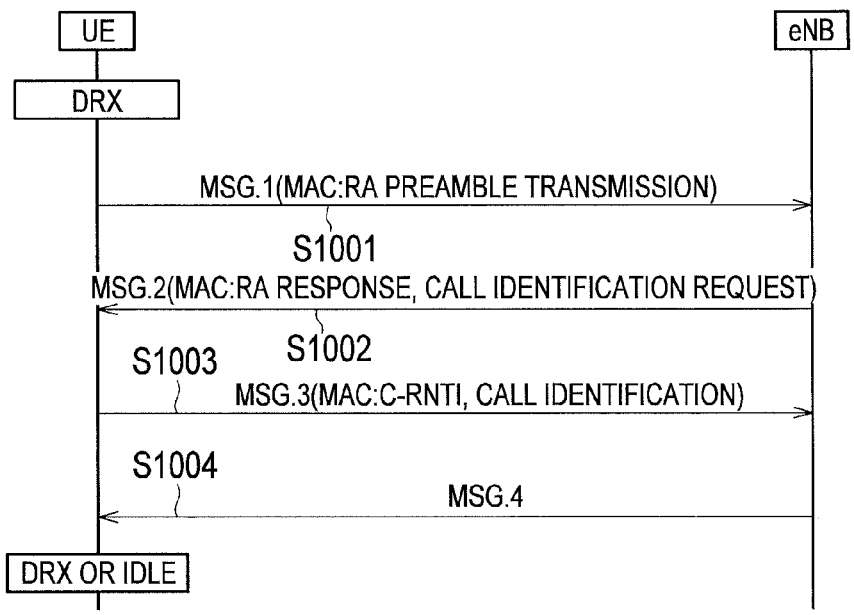
FIG. 9 is a flowchart for describing operation of the mobile communication system according to the first embodiment of the present invention.
FIG. 10 is a diagram showing an example of RNTI used by a radio base station according to Modification 1 of the present invention.

As shown in FIG. 9, when determining a return from the DRX state to the non-DRX state to perform call origination processing, the mobile station UE transmits "Random Access Preamble (RA preamble)" to the radio base station eNB in step S1001, to start a random access procedure (Contention Based RA procedure).

In step S1002, the radio base station eNB transmits "Random Access Response" to the mobile station UE.

Here, the radio base station eNB transmits "Call Identification Request" together with "Random Access Response" to the mobile station UE.

In step S1003, the mobile station UE transmits only MAC-CE notifying C-RNTI of the mobile station UE, as "Message3", to the radio base station eNB.

Here, the mobile station UE transmits "Call Identification" together with "Message3" to the radio base station eNB.

The radio base station eNB determines whether to allow the above-described return based on "Call Identification".

Here, when determining rejection of the above-described return, the radio base station eNB transmits the above-described predetermined MAC-CE, "RRC Connection Release", or the like as "Message4" to the mobile station UE in step S1004, in response to the MAC-CE.

In the present invention according to the present embodiment, the radio base station eNB can determine whether to allow the return based on "Call Identification" acquired from the mobile station UE, in the RA procedure in the return from the DRX state to the non-DRX state. Therefore, even in the case where many mobile stations UE in the DRX state perform event of multiple occurrences of call origination processing by the mobile stations UE in the DRX state, it is possible to improve the probability of success in call origination processing by a priority terminal or call origination processing of an emergency call.

(Modification 1)

With reference to FIG. 10, a mobile communication system according to Modification 1 of the present invention is described below, focusing on a point different from the mobile communication system according to the above-described first embodiment.

In the mobile communication system according to the present embodiment, the RA-procedure execution unit 11 of the radio base station eNB is configured to transmit PDCCH using predetermined RNTI, instead of transmitting PDCCH using C-RNTI notified by MAC-CE received from the mobile station UE, in the above-described RA procedure, when rejecting the return of the mobile station UE from the DRX state to the non-DRX state.

In this case, for example, the RA-procedure execution unit 11 may be configured to use "FFFFC" that is a Reserve bit not currently used, as predetermined RNTI, as shown in FIG. 10.

The features of the embodiment may also be expressed as follows.

A first feature of the embodiment is summarized as a mobile communication method of executing a RA (random access) procedure between a mobile station UE and a radio base station eNB, when the mobile station UE in a DRX (Discontinuous Reception) state makes a return to a non-DRX state (a continuous reception state) to perform call origination processing, the mobile communication method including: a step A of causing the radio base station eNB in the RA (random access) procedure to transmit "Call Identification (call-type request signal)" to the mobile station UE, the "Call Identification" requesting notification of "Call Identification (call type)" concerned in the call origination processing; a step B of causing the mobile station UE in the RA procedure to notify the radio base station eNB of the "Call Identification" in response to the "Call Identification Request"; and a step C of causing the radio base station eNB in the RA procedure to determine whether to allow the return based on the "Call Identification".

In the first feature of the embodiment, the radio base station eNB may transmit the "Call Identification" together with "Random Access Response (random access response signal)" in the step A.

In the first feature of the embodiment, the mobile station UE may transmit the call type included in "Message3" in the step B.

A first feature of the embodiment is summarized as a radio base station including: a RA (random-access) procedure execution unit 11 configured to execute RA procedure with a mobile station, when the mobile station UE makes a return from DRX state to non-DRX state; and a determination unit 12 configured to determine whether to allow the return. Here, the Rik-procedure execution unit 11 is configured to transmit "Call Identification Request" to the mobile station UE in the RA procedure, the "Call Identification Request" requesting notification of "Call Identification" concerned in the call origination processing, and the determination unit 12 is configured to determine, in the RA procedure, whether to allow the return based on the "Call Identification" notified by the mobile station UE in response to the "Call Identification Request".

In the second feature of the embodiment, the RA-procedure execution unit 11 may be configured to transmit the "Call Identification Request" together with "Random Access Response".

It should be noted that the foregoing operations of the mobile station UE and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base station eNB. Otherwise, the storage medium and the processor may be provided as discrete components inside the mobile station UE and the radio base station eNB.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention; which are determined by the description of the scope of claims. Therefore, the description of the specification is intended for illustrative explanation only and does not impose any limited interpretation on the present invention.

Note that the entire content of Japanese Patent Application No. 2012-152309 (filed on Jul. 6, 2012) is incorporated by reference in the present specification.

INDUSTRIAL APPLICABILITY

As described above, according to the present invention, it is possible to provide a mobile communication method and a radio base station that are capable of improving the probability of success, even under traffic congestion, in call origination processing of an emergency call from the mobile station UE in the DRX state or call origination processing from a priority terminal in the DRX state.

EXPLANATION OF THE REFERENCE NUMERALS

UE mobile station
eNB radio base station
11, 22 RA-procedure execution unit
12 determination unit
21 state management unit

The invention claimed is:

1. A mobile communication method of executing a random access procedure between a mobile station and a radio base station, when the mobile station in an intermittent reception state makes a return to a continuous reception state to perform call origination processing, the mobile communication method comprising:
 a step A of causing the radio base station in the random access procedure to transmit a call-type request signal to the mobile station, the call-type request signal requesting notification of a call type concerned in the call origination processing;
 a step B of causing the mobile station in the random access procedure to notify the radio base station of the call type in response to the call-type request signal; and
 a step C of causing the radio base station in the random access procedure to determine whether to allow the return based on the call type.

2. The mobile communication method according to claim 1, wherein the radio base station transmits the call-type request signal together with a random access response signal in the step A.

3. The mobile communication method according to claim 1, wherein the mobile station transmits the call type included in "Message3" in the step B.

4. A radio base station comprising:
 a random-access-procedure execution unit configured to execute a random access procedure with a mobile station, when the mobile station makes a return from an intermittent reception state to a continuous reception state; and
 a determination unit configured to determine whether to allow the return,
 wherein the random-access-procedure execution unit is configured to transmit a call-type request signal to the mobile station in the random access procedure, the call-type request signal requesting notification of a call type concerned in the call origination processing, and
 the determination unit is configured to determine, in the random access procedure, whether to allow the return based on the call type notified by the mobile station in response to the call-type request signal.

5. The radio base station according to claim 4, wherein the random-access-procedure execution unit is configured to transmit the call-type request signal together with a random access response signal.

* * * * *